(12) United States Patent
Bianciotto et al.

(10) Patent No.: US 9,871,615 B2
(45) Date of Patent: *Jan. 16, 2018

(54) CLOCK RECOVERY METHOD AND CLOCK RECOVERY ARRANGEMENT FOR COHERENT POLARIZATION MULTIPLEX RECEIVERS

(71) Applicant: Xieon Networks S.à.r.l., Senningerberg (LU)

(72) Inventors: Alessandro Bianciotto, München (DE); Bernhard Spinnler, Oberhaching (DE); Antonio Napoli, München (DE); Christina Hebebrand, Kiel (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,790

(22) Filed: Sep. 28, 2016

(65) Prior Publication Data

US 2017/0019206 A1      Jan. 19, 2017

Related U.S. Application Data

(63) Continuation of application No. 14/735,515, filed on Jun. 10, 2015, now Pat. No. 9,467,246, which is a (Continued)

(30) Foreign Application Priority Data

Feb. 5, 2010    (EP) .................................... 10001212

(51) Int. Cl.
*H04B 10/00*   (2013.01)
*H04B 10/06*   (2006.01)
(Continued)

(52) U.S. Cl.
CPC ............ *H04J 14/06* (2013.01); *H04B 10/614* (2013.01); *H04B 10/6161* (2013.01);
(Continued)

(58) Field of Classification Search
CPC ... H04J 14/06; H04B 10/614; H04B 10/6161; H04B 10/6165; H04L 7/0075; H04L 7/0331; H04L 7/0029; H04L 7/0079
(Continued)

(56) References Cited

U.S. PATENT DOCUMENTS 5,761,211 A * 6/1998 Yamaguchi ............. H04L 7/042
                                                          375/224
5,805,619 A * 9/1998 Gardner ........... G11B 20/10009
                                                          360/51
(Continued)

FOREIGN PATENT DOCUMENTS

WO    2007045070 A1    4/2007
WO    2009/070881 A1    6/2009

OTHER PUBLICATIONS

Gardner F M: "A BPSK/QPSK Timing-Error Detector for Sampled Receivers", IEEE 1 Transactions on Communications, IEEE Service Center, Piscataway, NJ, US LNKD-DOI:10.1109fTCOM.1986. 1096561, vol. 34, No. 5, May 1, 1986 (May 1, 1986), pp. 423-429, XPOO0608506.

(Continued)

*Primary Examiner* — Ken N Vanderpuye
*Assistant Examiner* — Dibson Sanchez
(74) *Attorney, Agent, or Firm* — Nelson Mullins Riley & Scarborough LLP

(57)    ABSTRACT

Component signal values are derived from component signals and fed to at least one fixed equalizer which generates equalizer output signals. The signals are fed to phase error detectors generating phase error signals. The phase error
(Continued)

signals are combined with further phase error signals derived by further error detectors receiving signal values from further equalizers and/or the component signal values directly from sample units.

6 Claims, 6 Drawing Sheets

Related U.S. Application Data continuation of application No. 13/577,297, filed as application No. PCT/EP2011/051441 on Feb. 2, 2011, now Pat. No. 9,065,590.

(51) Int. Cl.
| | |
|---|---|
| *H04J 14/06* | (2006.01) |
| *H04B 10/61* | (2013.01) |
| *H04L 7/033* | (2006.01) |
| *H04L 7/00* | (2006.01) |

(52) U.S. Cl.
CPC ....... *H04B 10/6165* (2013.01); *H04L 7/0075* (2013.01); *H04L 7/0079* (2013.01); *H04L 7/0331* (2013.01); *H04L 7/0029* (2013.01)

(58) Field of Classification Search
USPC .................................. 398/202–214, 154–155
See application file for complete search history.

(56) References Cited

U.S. PATENT DOCUMENTS

| | | | |
|---|---|---|---|
| 5,867,542 | A | 2/1999 | Iwamatsu et al. |
| 5,905,405 | A | 5/1999 | Ishizawa |
| 6,055,119 | A * | 4/2000 | Lee .................. G11B 20/10009 |
| | | | 360/51 |
| 6,330,273 | B1 | 12/2001 | Hulbert et al. |
| 6,370,188 | B1 * | 4/2002 | Wu ..................... H04L 27/2657 |
| | | | 375/222 |
| 7,110,475 | B2 | 9/2006 | Jun |
| 7,200,196 | B2 | 4/2007 | Li et al. |
| 7,245,658 | B2 * | 7/2007 | Wang ............... G11B 20/10009 |
| | | | 375/229 |
| 7,317,772 | B2 | 1/2008 | Samueli et al. |
| 7,482,953 | B2 | 1/2009 | Aerts et al. |
| 7,522,841 | B2 | 4/2009 | Bontu et al. |
| 7,627,252 | B2 | 12/2009 | Sun et al. |
| 7,894,728 | B1 | 2/2011 | Sun et al. |
| 7,936,999 | B1 | 5/2011 | Hawryluck et al. |
| 8,078,065 | B2 | 12/2011 | Koc |
| 8,135,283 | B2 | 3/2012 | Sun et al. |
| 8,244,142 | B2 | 8/2012 | Wagner et al. |
| 8,331,803 | B2 | 12/2012 | Li et al. |
| 8,406,638 | B2 | 3/2013 | Hoshida |
| 8,452,186 | B2 | 5/2013 | Sun et al. |
| 8,515,293 | B2 | 8/2013 | Yasuda et al. |
| 8,532,503 | B2 * | 9/2013 | Nakashima ............ H04B 10/60 |
| | | | 398/202 |
| 8,655,191 | B2 | 2/2014 | Kaneda et al. |
| 8,737,542 | B1 * | 5/2014 | Venkataraman ...... H04L 1/0047 |
| | | | 375/232 |
| 8,761,609 | B1 * | 6/2014 | Agazzi ................ H04B 10/616 |
| | | | 398/155 |
| 8,861,648 | B2 | 10/2014 | Noguchi et al. |
| 9,065,590 | B2 | 6/2015 | Bianciotto et al. |
| 2002/0106043 | A1 * | 8/2002 | Sasaki ................... H04L 7/0029 |
| | | | 375/355 |
| 2003/0021370 | A1 | 1/2003 | Menkhoff |
| 2003/0189995 | A1 | 10/2003 | Strolle et al. |
| 2004/0047463 | A1 | 3/2004 | Hwang |
| 2004/0091273 | A1 | 5/2004 | Brissette et al. |
| 2004/0114700 | A1 * | 6/2004 | Yu ..................... H04L 25/03057 |
| | | | 375/371 |
| 2004/0223567 | A1 | 11/2004 | Liu |
| 2004/0223568 | A1 * | 11/2004 | Liu ....................... H04L 7/0037 |
| | | | 375/355 |
| 2005/0286904 | A1 | 12/2005 | Calabro et al. |
| 2006/0013597 | A1 | 1/2006 | Crivelli et al. |
| 2006/0146918 | A1 | 7/2006 | Black et al. |
| 2006/0285855 | A1 | 12/2006 | Sun et al. |
| 2007/0092259 | A1 | 4/2007 | Bontu et al. |
| 2007/0253515 | A1 | 11/2007 | Kawai |
| 2008/0056403 | A1 | 3/2008 | Wilson |
| 2008/0080650 | A1 * | 4/2008 | Adachi ................ H04L 7/0029 |
| | | | 375/355 |
| 2008/0198051 | A1 | 8/2008 | Tanimura et al. |
| 2008/0240221 | A1 * | 10/2008 | Morris ................ H04L 27/3863 |
| | | | 375/232 |
| 2009/0113504 | A1 * | 4/2009 | Jackson ................ H04N 7/106 |
| | | | 725/114 |
| 2009/0148164 | A1 | 6/2009 | Roberts et al. |
| 2009/0190926 | A1 | 7/2009 | Charlet et al. |
| 2009/0304064 | A1 | 12/2009 | Liu et al. |
| 2009/0317092 | A1 * | 12/2009 | Nakashima ............ H04B 10/61 |
| | | | 398/204 |
| 2010/0003028 | A1 | 1/2010 | Zhang et al. |
| 2011/0002423 | A1 | 1/2011 | Hauske et al. |
| 2011/0008059 | A1 | 1/2011 | Chang et al. |
| 2011/0033191 | A1 * | 2/2011 | Hauske ................ H04B 10/611 |
| | | | 398/154 |
| 2011/0200339 | A1 | 8/2011 | Komaki et al. |
| 2012/0069941 | A1 * | 3/2012 | Herbig ................ H04B 7/0851 |
| | | | 375/347 |
| 2012/0308234 | A1 | 12/2012 | Bianciotto et al. |
| 2015/0280857 | A1 | 10/2015 | Bianciotto et al. |

OTHER PUBLICATIONS

Kuschnerov et al., "Joint Equalization and Timing Recovery for Coherent Fiber Optic Receivers", Sep. 2008, Optical Communication, 2008. ECOC 2008. 34th European Conference, pp. 1-2.

Oerder M et al: "Digital Filter and Square Timing Recovery", IEEE Transactions on 2 Communications, IEEE Service Center, Piscataway, NJ, US LNKD-DOI:10.1109f26.1476, vol. 36, No. 5, May 1, 1988 (May 1, 1988), pp. 605-612, XPOO0615025.

Tanimura et al , Digital Clock Recovery Algorithm for Optical Coherent Receivers Operating Independent of Laser Frequency Offset, Sep. 2008, ECOC, Mo.3.D.2, All Document.

Xian et al, "Digital Timing Recovery Combined with adaptive Equalization for Optical Coherent Receivers", Nov. 2009, Communications and Photonics Conference and Exhibition (ACP), 2009 Asia (Vol. 2009—Supplement), pp. 1-6.

* cited by examiner

CLOCK RECOVERY METHOD AND CLOCK RECOVERY ARRANGEMENT FOR COHERENT POLARIZATION MULTIPLEX RECEIVERS

RELATED APPLICATIONS

The present application is a continuation of patent application Ser. No. 14/735,515, filed on Jun. 10, 2015; now U.S. Pat. No. 9,467,246; which is a continuation of patent application Ser. No. 13/577,297, filed on Aug. 6, 2012; now U.S. Pat. No. 9,065,590; which is a national stage entry of International Application No. PCT/EP2011/051441, filed on Feb. 2, 2011; and which claims priority to European Patent Application No. 10001212.9, filed on Feb. 5, 2010; the contents of which are incorporated herein in their entirety.

BACKGROUND OF THE INVENTION

In order to meet the growing demand for internet bandwidth with traffic growth rates around 40-50% per year, telecommunication component providers face the task of increasing the spectral efficiency of modulation formats for fiber transmission. After 10 Gbit/s systems became successful in the 1990's, solutions for 40 Gbit/s became available in the last years. Standardization and research are now focused on the development of 100 Gbit/s systems. Coherent polarization multiplex systems with quadrature phase shift keying QPSK or differential quadrature phase shift keying (DQPSK) are the most likely modulation format for next generation systems. Since polarization multiplexing utilizes orthogonal light polarizations, it is possible to transmit a signal at a rate of ~25-28 Gigasymbols per second, thus fitting into the standard 50 GHz grid for DWDM optical systems. Coherent signal reception makes it possible to compensate linear transmission impairments like chromatic dispersion and polarization-mode dispersion after sampling in the digital domain. Here research and development faces the challenge of digital signal processing algorithms and chip design.

FIG. 1 shows an exemplary coherent receiver for polarization multiplex signals. A received signal comprising two orthogonal optical signals is split by a polarisation beam splitter 1 into two orthogonal component signals x and y. Each of these component signals is split by optical 90°— hybrids 2 and 3 into an in-phase component xi; yi and a quadrature-phase component xq; yq. Therefore frequency and phase of a local carrier generated by a local oscillator 4 must be adjusted by a carrier recovery unit 12 to agree with that of the received polarisation multiplex signal.

After analogue-to-digital conversion by AD-converters (ADC) 5-8 a sampled and quantized representation of the received optical signal is available in digital form referred to as component values XI, XQ; YI, YQ. Such values contain statistic noisy distortions, deterministic channel degradations such as chromatic dispersion, and random time-varying distortions mainly due to polarization effects. A dispersion compensation unit 9 is usually added for first coarse chromatic dispersion compensation.

In addition, a clock recovery subsystem 10 is necessary extracting a correct sampling clock frequency and a correct sampling clock phase from the received signal. In the literature, several approaches to timing information extraction have been proposed for digital signals, in particular:

F. M. Gardner describes "A BPSK/QPSK Timing-Error Detector for Sampled Receivers", *IEEE Transactions on Communications*, Vol. COM-34, No. 5, May 1986, pp. 423-429, and M. Oerder and H. Meyer describe a "Digital filter and square timing recovery," IEEE. Trans. Comm., vol. 36, pp. 605-612, May 1988. Both phase error detectors are fed with a single optical transmission signal.

The polarization of the incoming optical polarisation multiplex signal varies unpredictably over time and it is thus randomly misaligned with respect to the reference axes of the polarization beam splitter 1 used at the receiver's input to separate the incoming polarization multiplexed signal components. This causes the orthogonal optical signals to mix (polarization mixing) into a linear combination dependent on a polarization mixing angle α between the incoming signal's polarizations and the reference axes of the polarization beam splitter. Furthermore, the received orthogonal optical signals experienced a random relative delay due to differential group delay (DGD) effects, e.g. according to polarization mode dispersion. As a result, also the derived electrical signal represented by digital values consists of a random linear combination of the transmitted orthogonal signals additionally affected by a random phase misalignment.

The conventional phase error detectors described by F. M. Gardner or M. Oerder can be used to adjust sampling frequency and phase in a phase locked loop (PLL). These phase detectors assume an already fully equalized input signal, where the input polarization components are phase-aligned and the QPSK components (I and Q) are perfectly separated and not an arbitrary linear combination of the orthogonal component signals x and y.

The Gardner phase error detector's output signal as a function of the phase error possesses a horizontal sinusoidal shape and is commonly termed s-curve. Its amplitude or its maximum derivation is termed by Gardner as "phase detector gain factor" indicating the performance quality. This "phase detector gain factor" is here referred to as "gain coefficient". In presence of α and DGD effects the phase error information provided by these algorithms degrades significantly according to input signal conditions. This is illustrated in FIG. 2 where a normalized gain coefficient $K/K_{REF}$ ($K_{REF}$—gain coefficient referent value) of the Gardner phase error detector is plotted versus the phase difference DGD/T (DGD—differential group delay; T—symbol duration) between orthogonal polarisation signals (termed $y_1$ and $y_Q$ by Gardner) and for several values of the polarization mixing angle a. FIG. 2 clearly shows that in the worst case for a=π/4 and DGD=T/2, the phase information contained in the original orthogonal optical signals adds destructively and the normalized gain coefficient $K/K_{REF}$ vanishes, leaving a PLL without any valid control information, rendering the loop inoperable.

Following the clock recovery subsystem, the receiver comprises also a butterfly equalizer 11 reconstructing the original orthogonal signals and compensating distortions. The Regained symbol values D1(n), D2(n) are then fed to a carrier recovery unit 12 correcting frequency and phase mismatches between input signal's and local oscillator's carriers. At the output of the carrier recovery unit, the QPSK signal constellation is constant and correctly positioned on the complex (I/Q) plane. The symbols D1(n), D2(n) are fed to a symbol estimation (decoding) unit 13 which outputs regained data signals DS1, DS2. These signals are then fed to a parallel-serial-converter 14 and converted into a serial data signal SDS.

BRIEF SUMMARY OF THE INVENTION

It is an object of the invention to provide a clock recovery method and a clock recovery arrangement for coherent polarisation multiplex receivers extracting the correct sampling clock frequency and clock phase from the received signal.

A clock recovery method for coherent multiplex receivers according to the invention comprises the steps of
  coherent demodulating a received polarization multiplex signal and deriving orthogonal signal components,
  sampling and converting the orthogonal signal components into digital component values,
  feeding said component values to at least one equalizer,
  deriving phase error values from output values of said at least one equalizers, and from output values of further equalizers or the component values,
  calculating resulting phase error values from at least two derived phase error value
  deriving an oscillator control signal from said resulting phase error values, and
  controlling at least one controllable oscillator generating a sample signal for sampling said orthogonal signal components or re-sampling the component values.

The transfer functions of the equalizers are chosen that, under any polarization rotation condition, at least one of them will effectively reverse the linear combination of the originally orthogonal polarization components outputting signal values suitable for phase error detection. The gained phase error values are combined to resulting phase error values controlling the PLL.

It is advantageous
  combining more than two phase error values derived from output values of more than one equalizer.

The probability of matching the polarization mixing angle and therefore to obtain at least more suited input signals for phase error detectors is increased with the number of fixed equalizers.

The quality of the resulting phase error values is further improved by
  calculating gain coefficients as weighting factors evaluating the—performance of the phase error detectors,
  calculating weighted phase error values by applying said gain coefficients, and
  adding the weighted phase error values deriving summarized weighted phase error values.

The performance of the phase error detectors depends on the quality of the equalizer output values. The quality is evaluated and used as a weighting factor selecting or combining the phase error values to an optimized resulting phase error signal.

A clock recovering arrangement for coherent phase multiplex receivers comprises
  a combined phase error detector unit with at least one fixed equalizers receiving sampled component values and outputting equalizer output values, with
  a plurality of phase error detectors receiving equalizer output values or component values generating phase error values, and with
  means for combining phase error signals to derive resultant error values for controlling at least one controllable oscillator of the at least one phase locked loop.

A digital solution allows a low cost solution for the complex arrangement.

The performance is further improved by
  means for deriving gain coefficients representing the performance of the phase error detectors,
  means applying the gain coefficients as weighting factors for deriving resultant phase error values, which are virtually independent of a polarisation mixing angle between received orthogonal signals and a polarisation beam splitter and of differential group delay.

A combination of the phase error values with higher quality leads to improved resulting phase error values and therefore to a stable sample signal.

The realisation of the additional features above is done by corresponding means as used in the shown embodiments.

Further advantageous features of the method and the arrangement are described in remaining dependent claims.

BRIEF DESCRIPTION OF THE DRAWINGS

Examples of the invention including an embodiment are described below with reference to accompanying drawings.

DETAILED DESCRIPTION OF THE INVENTION

Figure 1:
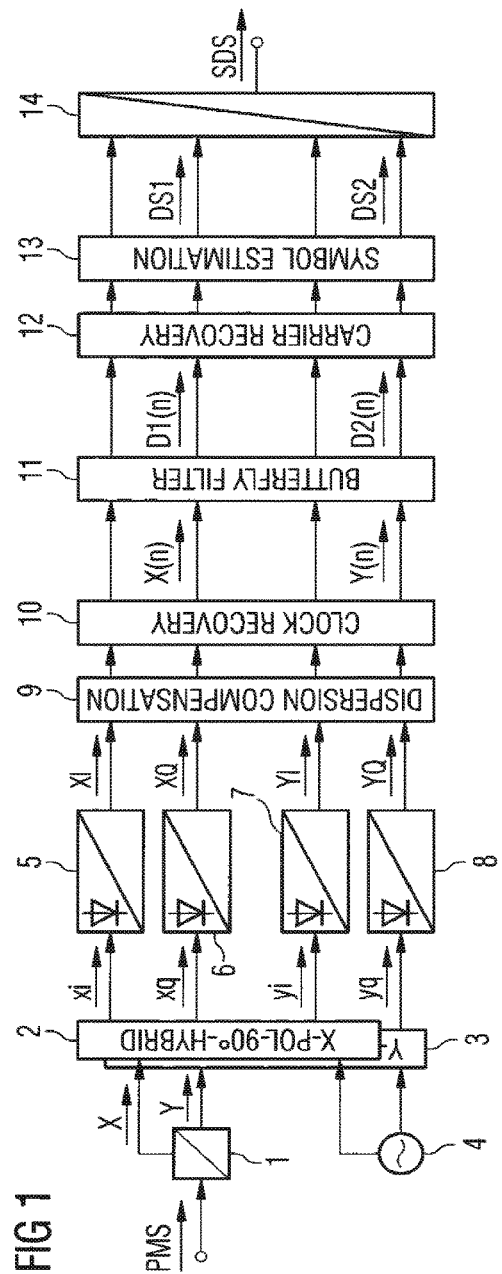
FIG. 1 is a schematic diagram of a coherent polarisation multiplex receiver.
Figure 2:
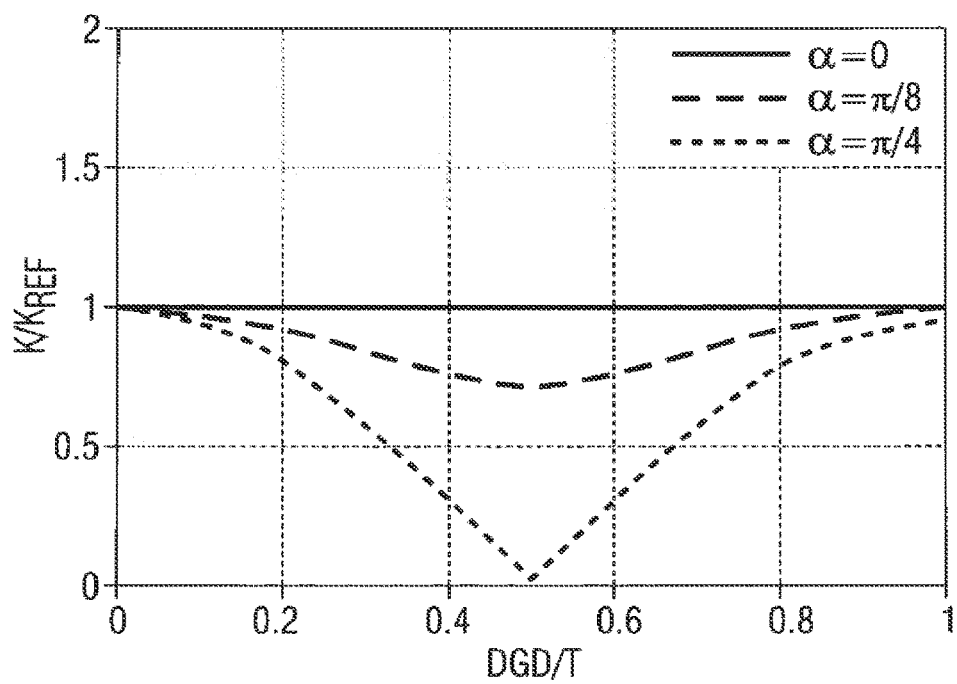
FIG. 2 shows a normalized gain coefficient $K_t/K_{REF}$ indicating the Gardner phase detector performance versus DGD (differential group delay) for several polarization mixing angles a as parameters.
Figure 3:
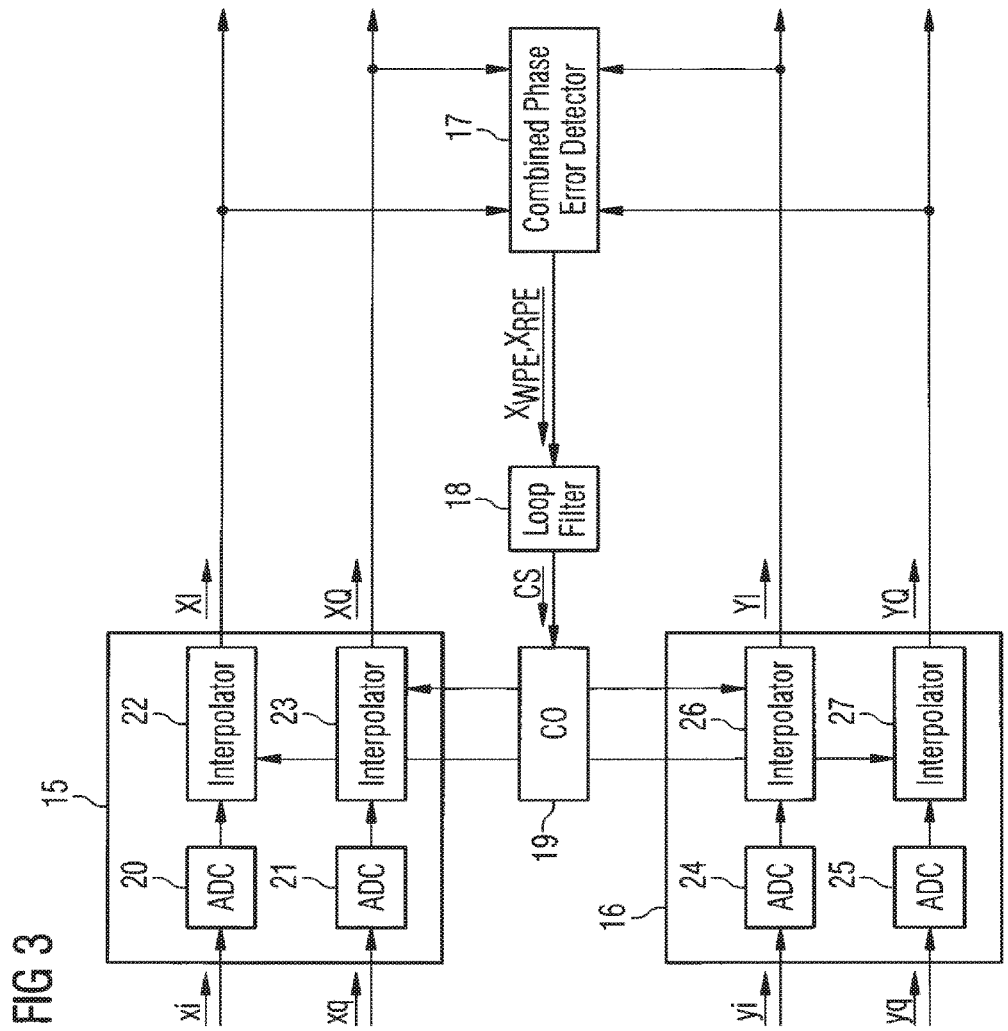
FIG. 3 is a simplified diagram of an inventive clock recovery arrangement.

FIG. 3 shows a simplified diagram of a presently preferred clock recovery arrangement according to the invention. The analogue signal components xi, xq and yi, yq output by the 90°-hybrids (FIG. 1) are fed to analogue-digital converters 20, 21 of a first sample unit 15 and 24, 25 of a second sample unit 16.

Sequences of the sampled component values XI, XQ and YI, YQ, (time variable [n] is here usually omitted) representing the signal components xi, xq, yi, yq, are fed to a combined phase error detector unit 17 to determine resulting phase error values $X_{WPE}$, $X_{RPE}$ which are fed via a loop filter 18 as control signal CS—where required after digital-analogue conversion
  to a controlled oscillator 19 (CO; numerical controlled or in the analogue domain voltage controlled) of a phase locked loop (PLL). The controlled oscillator 19 supplies the sampling units 15, 16 with a common clock signal CL or with separate clock signals. The clock signals may be adapted e.g. to different internal delay times.

The inventive clock recovery can be used both with synchronous for analogue-digital embodiments and asynchronous sampling for full digital realisation. The sample frequency of the clock signal CL is a multiple of the symbol frequency for synchronous sampling, or slightly higher or lower if asynchronous sampling is used. In the case of asynchronous sampling the sampled values are re-sampled by interpolators 23, 24 and 26, 27 as known to those skilled in the art.

In contrast to traditional clock recovery loops (PLLs) where the phase error information is a scalar quantity extracted by a single phase error detector (possibly per polarization), the invention uses the combined phase error detector unit 17 for extracting the phase error signal from a plurality of linearly combined signal components.

Figure 4:
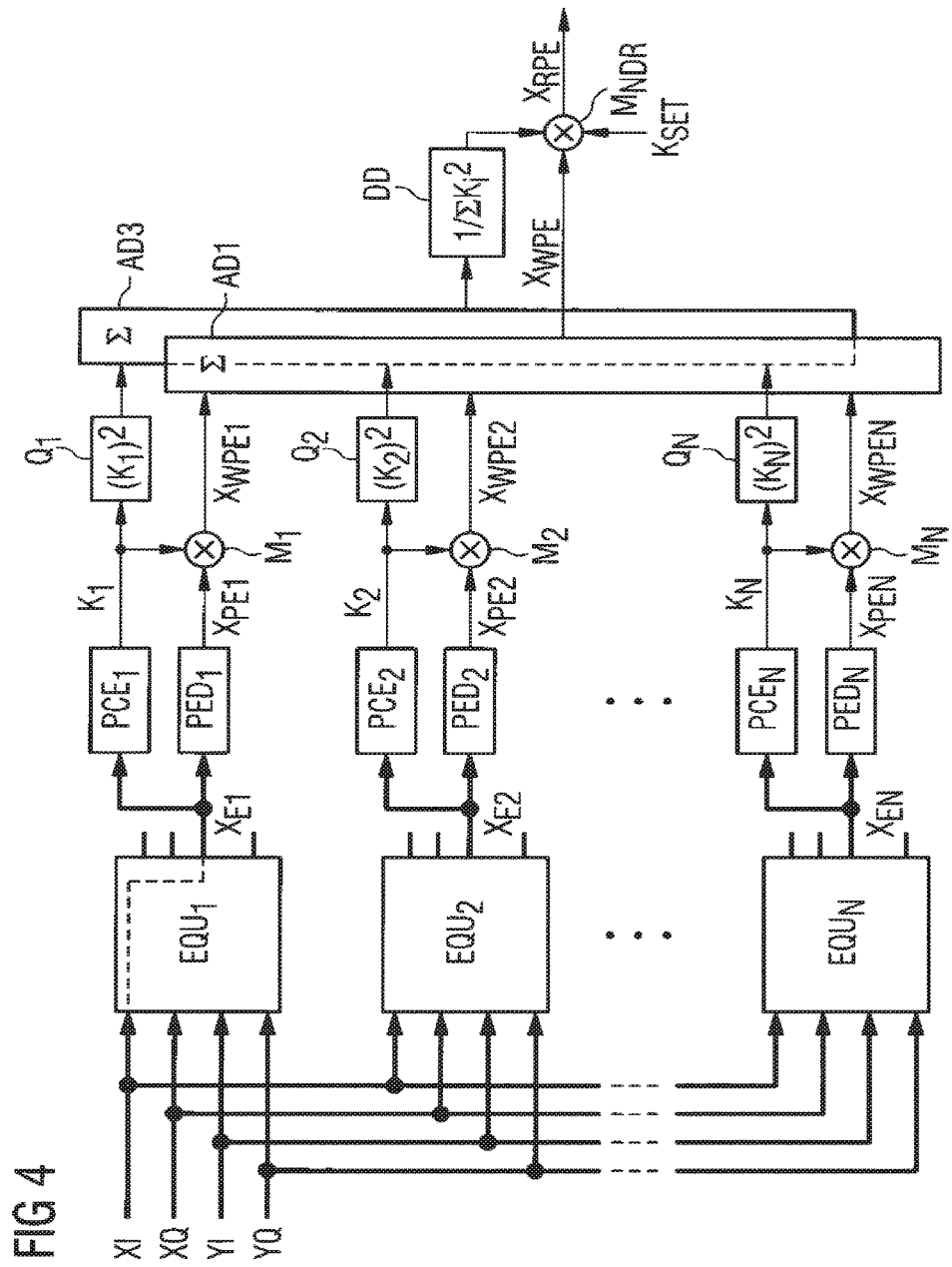
FIG. 4 is a block diagram of a combined phase error detector.

The combined phase error detector unit 17 shown in FIG. 4 comprises a set of N static equalizers $EQU_i$ with associated phase error detectors $PED_i$. The component values XI, XQ and YI, YQ are fed parallel to all equalizers, each being optimized for a specific polarization mixing condition (polarisation mixing angle α). According to a known butterfly structure (MIMO—multiple in—multiple out) an optimized equalizer can reconstruct the transmitted orthogonal signals, in the shown embodiment represented by digital equalizer component values $X_{Ei}$. The transfer functions of these equalizers are fixed, but chosen in such a way that, under any polarisation mixing angle α, at least one of them will effectively reverse the linear combination of the received orthogonal optical signals due to the polarisation mixing angle a, thus separating them. At least one of the output equalizer component values $X_{Ei}$ ($X_{Ei} = XI_{Ei}, XQ_{Ei}, YI_{Ei}$, or $YQ_{Ei}$—not shown in FIG. 4) of each equalizer $EQU_i$ is fed to one of N phase error detectors $PED_i$ as well as to N gain coefficient estimators $PCE_i$ (PCE—derived from chase detector gain coefficients estimator).

One of the equalizers may pass through at least one of the input component values, e.g. equalizer $EQU_1$ passes through component values XI, which are fed to a first phase error detector $PED_1$ instead of a modified equalizer output signal. But this "equalizer" may compensate other signal distortions.

The phase error detectors $PED_i$ output phase error values $X_{PEi}$ which are fed via multipliers $M_i$ to a first adder AD1, and the gain coefficient estimators PCEi output gain coefficients $K_i$ which are fed via squaring circuits $Q_i$ to a further adder AD3. The output of the first adder AD1 is connected to a normalizing multiplier $M_{NOR}$ and the output of the further adder AD3 is connected via a division device DD to a further input of said normalizing multiplier.

The purpose of the gain coefficient estimators $PCE_i$ is to estimate the gain coefficients $K_i$ of the associated phase error signals $X_{PEi}$ serving as weights favouring those phase error signals with the strongest phase information. Therefore, the phase error values $X_{PEi} = X_{PE1} - X_{PEN}$ are multiplied by said associated gain coefficients $K_i = K_1 - K_N$ derive weighted phase error signals $X_{WPi}$; that is $$X_{WPEi}[n] = K_i * X_{PE1}[n]$$

i=1, 2, . . . , N; n—sample instant.

A sum of the weighted phase errors $X_{WPEi}$ output from the multipliers $M_i$, is then computed by the adder AD1 as resultant weighted phase error value $X_{WPE}$:

$$X_{WPE}[n] = \Sigma X_{WPEi}[n]$$

i=1, 2, . . . , N; summation i=1, 2, . . . , N.

In a basic clock recovery implementation, the derived resultant weighted phase error values $X_{WPE}$ could be used as an input to the loop filter of the phase locked loop.

In a more advanced embodiment, the resulting phase error values $X_{WPE}$ become virtually independent of the input signal distortions by dividing them by a sum of squares of the individual gain coefficients $K_i$ summed up by the further adder AD3. Further, a scaling factor $K_{SET}$ can be imposed on the resultant weighted phase error values $X_{WPE}$ to achieve a resultant phase error values $X_{RPE}$, computing:

$$X_{RPE}[n] = X_{WPE}[n] * K_{SET} / (\Sigma K_i^2)$$

In the shown embodiment the calculation of is executed by the division device DD. Multiplication with $1/\Sigma K_i^2$ and the scaling factor $K_{SET}$ is executed by the normalizing multiplier $M_{NOR}$.

The gain coefficient estimators $PCE_1 - PCE_N$ are the key for the preceding calculation, and hence for a robust clock recovery process. Therefore, a more detailed description of the gain coefficient estimation process will be given here. The gain coefficients $K_i$ are computed as follows:

where $X_{PEIi}$ are in-phase and $X_{PEQi}$ are quadrature-phase error values computed from the output values $X_{Ei}$ of the various equalizers $EQU_i$. The in-phase phase error values are obtained by using the Gardner's formula as follows:

$$X_{PEIi}[n] = (X_{Ei}[n] - X_{Ei}[n-1]) \cdot X_{Ei}\left[n - \frac{1}{2}\right] \quad (5)$$

Where $X_{Ei}$ is at least one out of four signal components ($XI_{Ei}, XQ_{Ei}, YI_{Ei}, YQ_{Ei}$—only the outputs are shown in FIG. 4) output from the i-th equalizer. The quadrature-phase error values are instead computed by using a newly derived "quadrature" Gardner's formula as follows:

$$X_{PEQi}[n] = \frac{1}{2}\left(X_{Ei}[n] + X_{Ei}\left[n - \frac{1}{2}\right] - X_{Ei}[n-1] - X_{Ei}\left[n - \frac{3}{2}\right]\right) \cdot \left(X_{Ei}\left[n - \frac{1}{2}\right] + X_{Ei}[n-1]\right) \quad (6)$$

Both signals $X_{PEIi}[n]$ and $X_{PEQi}[n]$ derived from equalizer output signals $X_{Ei}[n]$, are functions of the phase error and feature horizontal sinusoidal s-curves. Because they are in quadrature (like sine and cosine function), nearly phase-error-independent gain coefficients $K_i$ are obtained when they are "root mean squared" according to equation (4). Their amplitudes are functions of distortions and indicate the performances of the equalizers and are functions of the remaining distortions, mainly of DGD/T and α effects.

To summarize, the derived gain coefficients $K_i$ are almost independent of phase errors of the equalizers' output signals $X_{Ei}$ and indicate the quality of the phase information. The gain coefficients are used to calculate the resultant phase error values $X_{RPE}$ according to equation (3) which are almost independent of the distortions DGD/T and α of the component signals x and y.

Other arrangements and mathematical calculation leading to a similar stable resulting phase error signal and therefore to a stable control signal, which is almost independent of the distortion present in the input signals or the component signals respectively, might also be used. The arrangement may be upgraded by using both component values XI, XQ or YI, YQ for a complete Gardner phase error detector or even all component values. This is not shown in FIG. 4 and not outlined in the formulas for clarity reasons. Two different PLLs may also be used for sampling the signal components xi, xq and yi, yq separately. Two resulting phase error values for the two PLLs are then generated separately by two different sets of phase detectors with allocated gain coefficient estimators.

Figure 5:
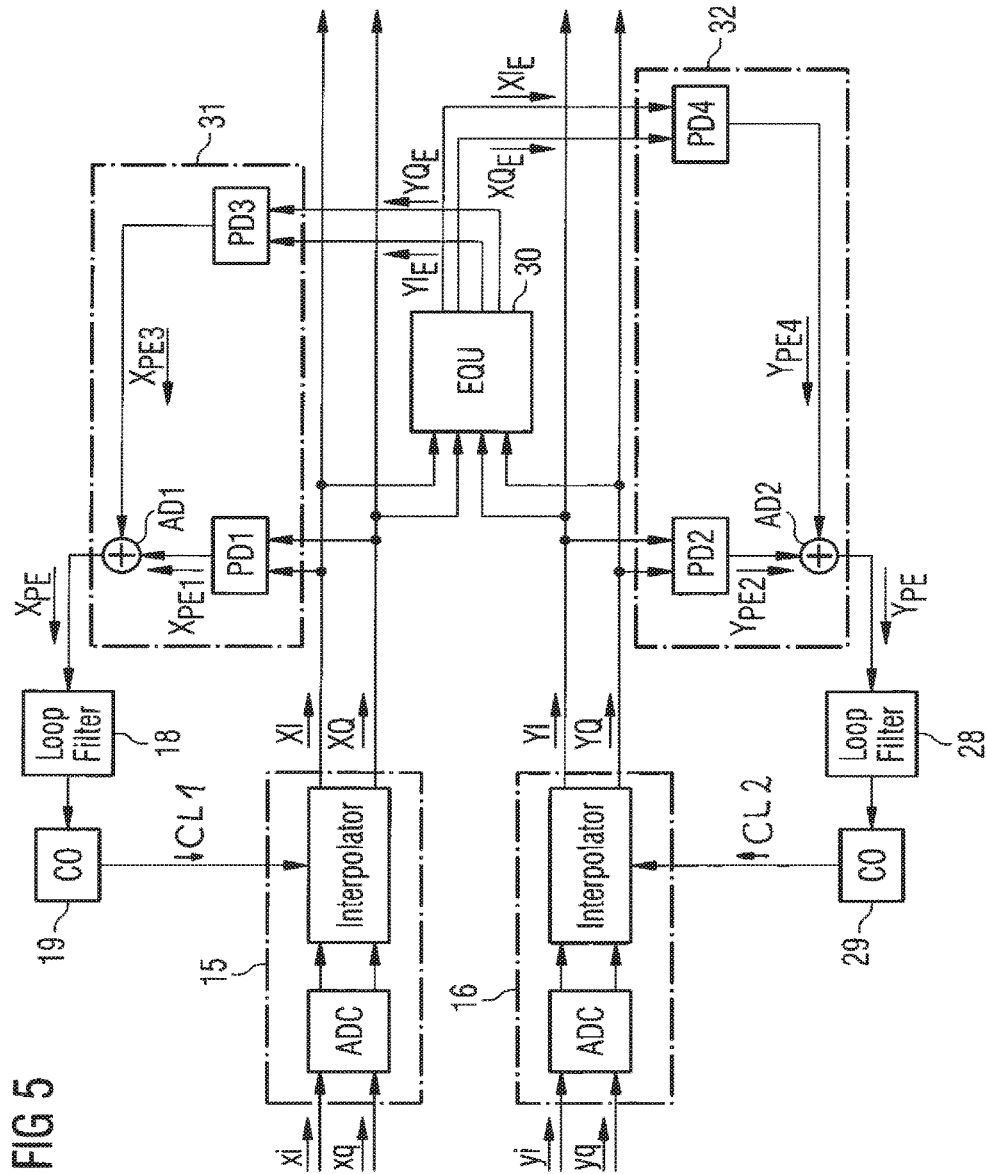
FIG. 5 shows a simplified embodiment of the invention.

FIG. 5 shows a further simplified low cost embodiment of a clock recovery comprising two PLLs. The figure shows a simplified illustration of two sample units 15 and 16. A first and a second PLL are controlled by separate (Gardner) phase detector units 31 and 32.

The first phase detector unit 31 controls via the loop filter 18 the controllable oscillator (CO) 19 generating a first sample signal CL1 The second phase detector unit 32 controls via a second loop filter 32 a second CO 29 generating a second sample signal CL2. The x signal components xi, xq are sampled by the first sample signal CL1 and the y component signals yi, yq are sampled by second sample signal. The sampled XI and XQ component values are fed to a first phase error detector PD1, and the YI and YQ component values are fed to a second phase error detector PD2.

The first and second phase error detectors PD1 and PD2 generates phase error signals according to $$X_{PE1}[n]=XI[n-\tfrac{1}{2}](XI[n]-XI[n-1])+XQ[n-\tfrac{1}{2}](XQ[n]-XQ[n-1]) \quad (7); \text{ and}$$

$$Y_{PE2}[n]=YI[n-\tfrac{1}{2}](YI[n]-YI[n-1])+YQ[n-\tfrac{1}{2}](YQ[n]-YQ[n-1]) \quad (8)$$

A single fix equalizer 30 is used to generate two pairs of component values $XI_E$, $XQ_E$ and $YI_E$, $YQ_E$ rotated by 45° and fed to the additional phase detectors PD3 and PD4 respectively. The further phase error detectors PD3, PD4 generate appropri-ate phase error values $X_{PE3}$, $Y_{PE4}$ according to their input va-lues $XI_E$, $XQ_E$ and $YI_E$, $YQ_E$, $XQ_E$ respectively.

Both phase error values $X_{PE1}$, $X_{PE3}$ from the first and third phase error detector are fed to a first adder AD1 and combined to a first resulting phase error values $X_{PE}$.

Second resulting phase error values $Y_{PE}$ controlling the second loop are generated by the second phase error detector PD2 receiving the YI and YQ component values and by the fourth phase error detector PD4 receiving the component values XIE and $XQ_E$ from further equalizer outputs. Both phase error values $Y_{PE2}$ and $Y_{PE4}$ are added by the second adder AD2.

Figure 6:
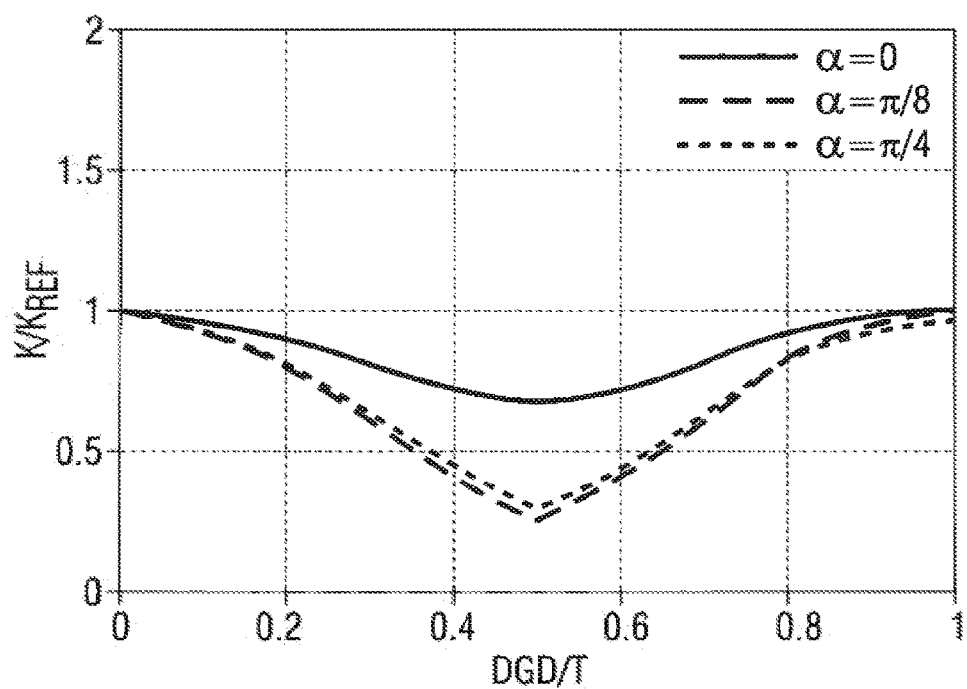
FIG. 6 shows the normalized gain coefficient $K_t/K_{REF}$ of an inventive phase error detector versus DGD.

FIG. 6 shows the normalized gain coefficient $K/K_{REF}$ for the embodiment shown in FIG. 5 employing only one equalizer and trivial weighting of the phase detector outputs by the gain coefficients 1.0. As can be readily seen, the fluctuations of $K/K_{REF}$ versus DGD are relatively small. Moreover, $K/K_{REF}$ does not approach zero for any combination of DGD and α including the worst case represented by a=45 degree and DGD=T/2.

A second equalizer or further equalizers would improve the 25 performance significantly.

In addition, all static equalizers can be adjusted to compensate different distortions in order to achieve optimum performance.

The present invention is not limited to the details of the above described principles. The scope of the invention is defined by the appended claims and all changes and modifications as fall within the equivalents of the scope of the claims are therefore to be embraced by the invention. Mathematical conversions or equivalent calculations of the signal values based on the inventive method or the use of analogue signals instead of digital values are also incorporated.

REFERENCE SIGNS 1 polarisation beam splitter
2 x-90°-hybrid
3 y-90°-hybrid
4 local oscillator
9 dispersion compensation unit
10 clock recovery unit
11 butterfly filter
12 carrier recovery unit
13 decoder
14 parallel-serial-converter
PMS polarization multiplex signal
SDS serial digital signal
15 x-sample unit
16 y-sample unit
17 combined phase error detector unit
18 loop filter
19 controlled oscillator (CO)
20, 21 analogue-digital-converter
22, 23 interpolator
24, 25 analogue-digital-converter
26, 27 interpolator
xi, xq; yi, yq signal components
CL, CL1, CL2 sample signal
xi in-phase x component
xq quadrature-phase x component
yi in-phase y component
yq quadrature y component
XI X in-phase component value
XQ X quadrature-phase component value
YI Y in-phase component value
YQ Y quadrature-phase component value
EQU equalizer
PED phase error detector
PCE gain coefficient estimator
Q squaring circuits
M multiplier
DD division device
$X_{Ei}$ equalizer output values
$X_{ETi}$ phase error values
$X_{PEIi}$ in-phase error values
$X_{PEOi}$ quadrature-phase error values
$X_{WPEi}$ weighted phase error values
$X_{WPE}$ resultant phase error values,
$X_{RPE}$ resultant phase error values
$X_{PE}$ resultant x phase error value
$Y_{PE}$ resultant y phase error value
$M_{NOR}$ normalizing multiplier
AD1 first adder
AD3 further adder
AD2 second adder
n sample instant
K gain coefficient
$K_{REF}$ reference gain coefficient
28 second loop filter
29 second controlled oscillator (CO)
30 equalizer
31 first phase error detector unit
32 second phase error detector unit
PD1-PD4 phase detector
A1, A2 adder
$XI_E$ equalizer x in-phase component output values
$XQ_E$ equalizer x quadrature component output values
$YI_E$ equalizer y in-phase component output values
$YQ_E$ equalizer y quadrature component output values
$X_{PE}$ x phase error values
$Y_{PE}$, y phase error values

The invention claimed is:

1. Clock recovery method for coherent polarization multiplex receivers, comprising the steps of
coherent demodulating a received polarization multiplex signal and deriving orthogonal signal components,
sampling and converting the orthogonal signal components into digital component values,
feeding said digital component values to a same equalizer, said equalizer being configured to effectively reverse the effect of polarization mixing of the received orthogonal signals for one specific polarization mixing angle, deriving a phase error value from output values of said equalizer and another phase error value from the digital component values, calculating resulting phase error values from at least two of the derived phase error values, deriving an oscillator control signal from said resulting phase error values, and controlling at least one controllable oscillator to generate a sample signal for sampling said orthogonal signal components or re-sample the digital component values.

2. Clock recovery method according to claim 1, wherein said resulting phase error values are calculated by combining phase error values directly derived from the digital component values with phase error values derived from the equalizer output values.

3. Clock recovery method according to claim 1, further comprising:

generating different resulting phase error values for two separate clock recovery loops, and generating two sample signals, each for sampling the orthogonal signal components or re-sampling the digital component values.

4. Clock recovery method according to claim 1, comprising the step of generating phase error values according to $$X_{PE1}[n]=XI_{Ei}[n-\frac{1}{2}](XI_{Ei}[n]-XI_{Ei}[n-1])+XQ_{Ei}[n-\frac{1}{2}](XQ_{Ei}[n]-XQ_{Ei}[n-1]), Y_{PE1}[n]=YI_{Ei}[n-\frac{1}{2}](YI_{Ei}[n]-YI_{Ei}[n-1])+YQ_{Ei}[n-\frac{1}{2}](YQ_{Ei}[n]-YQ_{Ei}[n-1])$$

wherein $XI_{Ei}$, $XQ_{Ei}$; $YI_{Ei}$, $YQ_{Ei}$ resemble equalizer output values or component signal values; n is an integer resembling a sample instant; and i=1, 2, . . . , N.

5. Clock recovery arrangement for a coherent polarization multiplex receiver with at least one phase locked loop deriving a sample signal, including a phase error detector unit receiving sampled component values, a loop filter, and a controllable oscillator, comprising a fixed equalizer receiving sampled component values and outputting equalizer output values, said equalizer being configured to effectively reverse the effect of polarization mixing of the received orthogonal signals for one specific polarization mixing angle, at least one phase error detector receiving equalizer output values and generating at least one phase error value, at least one phase error detector receiving sampled component values and generating at least one phase error value, and means for combining said phase error values to derive resultant phase error values for controlling at least one controllable oscillator of the at least one phase locked loop.

6. The clock recovery arrangement according to claim 5, comprising a first phase error detector unit generating a first control signal, a first phase locked loop receiving said first control signal and generating a first sample signal sampling x signal components, and a second phase error detector unit generating a second control signal, and a second phase locked loop receiving said second control signal and generating a second sample signal sampling y signal components.

* * * * *